ered, as indicated at 14, to 90
UNITED STATES PATENT OFFICE.

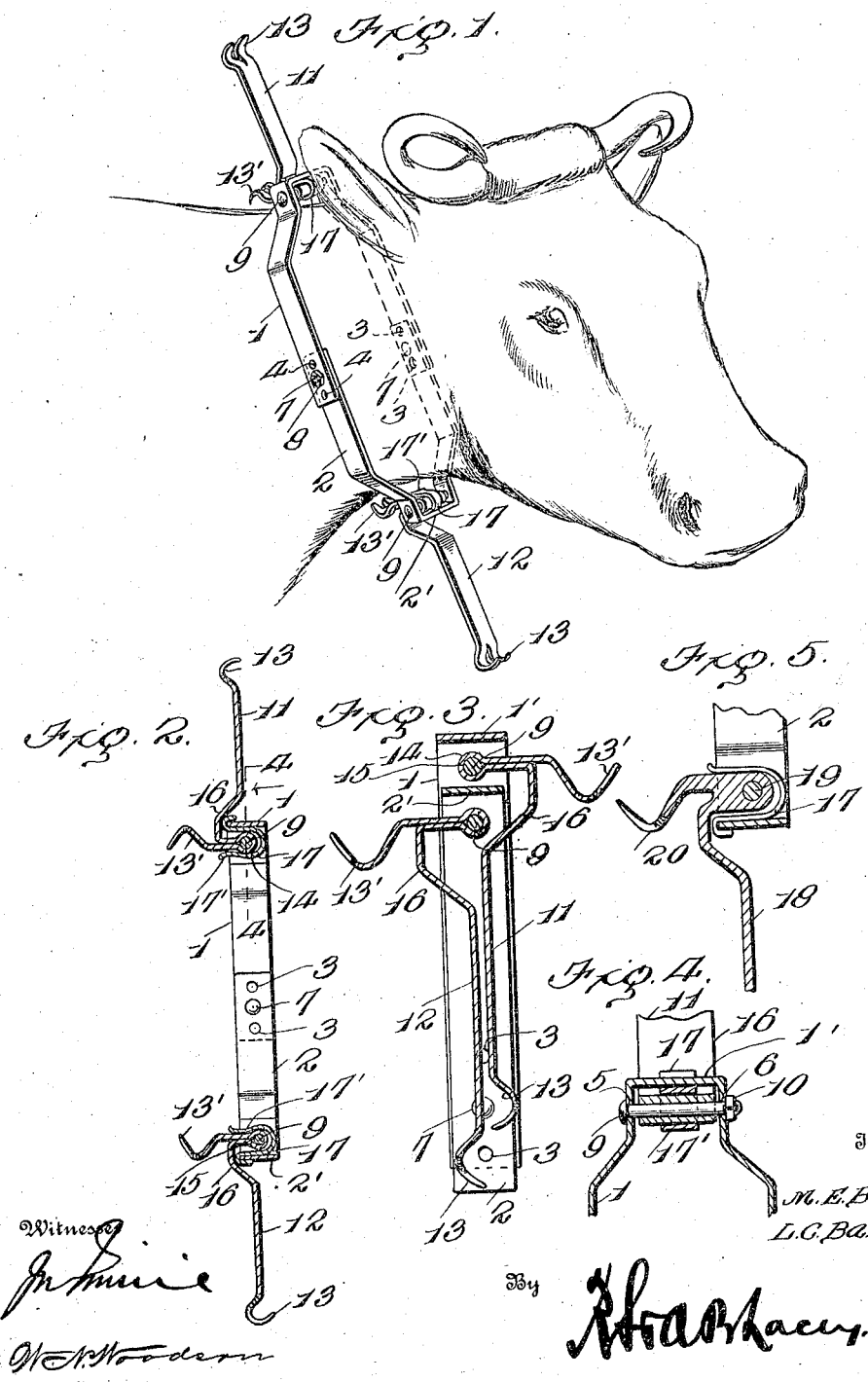

MELYN E. BAKER AND LEWIS C. BAKER, OF RIVERTON, NEBRASKA.

ANIMAL-POKE.

No. 924,219.     Specification of Letters Patent.     Patented June 8, 1909.

Application filed July 7, 1908. Serial No. 442,302.

*To all whom it may concern:*

Be it known that we, MELYN E. BAKER and LEWIS C. BAKER, citizens of the United States, residing at Riverton, in the county of Franklin and State of Nebraska, have invented certain new and useful Improvements in Animal-Pokes, of which the following is a specification.

This invention relates to animal pokes of that type carried by animals and so constructed as to inflict pain upon an animal when it attempts to pass through fence openings or over like restricted places.

This invention contemplates certain new and useful improvements in animal pokes and particularly in the construction of the neck engaging or neck members and the fence engaging members whereby the construction of these parts is rendered more simple and the operation of the fence engaging members rendered more efficient.

One of the objects of this invention is to construct an animal poke which may be compactly folded upon itself when not in use, or when it is desired to ship the same.

Another object of this invention is to construct an animal-carried poke provided with a plurality of pivotal fence engaging or stop members so arranged upon the body sections of the poke that the fence engaging members will press inwardly on an animal independently of the movement of the body sections.

With these and other objects in view, this invention comprises certain novel constructions, combinations and arrangements of parts shown in the accompanying drawings and particularly described in the specification and claim.

For a full understanding of the invention, reference is to be had to the following description and accompanying drawings, in which:

Figure 1 is a perspective view of our improved poke secured to a cow, Fig. 2 is a sectional view of our improved poke with the parts extended, Fig. 3 is a sectional view showing parts folded, Fig. 4 is a detail sectional view on the line 4—4 of Fig. 2, and, Fig. 5 is a view of a modification.

Corresponding and like parts are referred to in the following description and indicated in all the views of the drawings by the same reference characters.

The animal poke illustrated in the drawings, is particularly designed for cows, and it is understood that the various parts may be modified or changed with relation to each other so that our improved poke may be adapted for use with various species of domesticated animals and under varying conditions. In the drawing, the main body portion or yoke of our improved invention is constructed in two sections designated by numerals 1 and 2. Each of the sections 1 and 2 is preferably formed substantially U-shaped throughout and provided with a series of apertures 3 and 4 formed in the legs of each section, and a plurality of opposing apertures 5 and 6 formed in the intermediate portions 1' and 2' of the yoke sections. The legs of section 1 are adapted to engage the outer side of the legs of section 2 and the sections may be adjustably secured together by means of removable pivots or bolts 7 which are provided with nuts 8. The sections 1 and 2 when joined together by means of bolts 7, are movable in either direction.

Secured to the intermediate portions 1' and 2' of the yoke sections are two transverse pins 9 which in the present instance are in the form of threaded bolts and are inserted through the corresponding opposing openings 5 and 6, and are retained in position therein by means of nuts 10. These pins 9 are designed to pivotally support two fence-engaging or poke arms 11 and 12 which are preferably formed of strips of suitable metal and are provided at one end with prongs 13, while their other ends are doubled upon themselves or looped, as indicated at 14, to form a transverse opening 15 in which the respective pins 9 are loosely received, the metal strip being extended beyond the loop 14 to form an angularly disposed finger that preferably terminates in one or more prongs or spurs 13', as shown. The fence-engaging arms 11 and 12 are preferably offset near the loop 14, as indicated at 16, so as to embrace the intermediate portions 1' and 2' of the yoke sections and be susceptible of assuming positions in a plane coincident with the plane of the yoke, said engaging arms and the fingers carried thereby being supported, in the present instance, by means of substantially U-shaped spring clips 17, one end of which is returned upon itself, as shown, to take over the edge of the adjacent intermediate portion of the yoke sections, and which substantially embraces the corresponding loop 14 with its other extremity bearing against the 11 finger, as indicated at 17'. Through the instrumentality of these spring clips, the engaging arms 11 and 12 are normally supported in substantially the same plane as the plane of the yoke, and the fingers are maintained in spaced relation to the neck of the animal, so as to ordinarily cause no discomfort.

The application of our improved yoke to the neck of a cow, will be readily understood from the foregoing description. The sections 1 and 2 when pivotally joined by means of threaded bolts 7 constitute the neck engaging members or yoke, and the fence engaging members or levers 11 and 12, pivotally secured to members 1 and 2, are so arranged thereon that when the prongs 13 engage the wires of a fence, prongs 13' will be forced inwardly on the flesh of the animal and with this movement sections 1 and 2 will be forced toward each other. By means of the pivotally connected members 11 and 12 a given pressure upon the points 13 will exert a greater pressure by points 13' upon the animal than if the members 11 and 12 were rigidly secured to the members 1 and 2. The construction of members 11 and 12 may be changed so that the pivot opening is formed as in Fig. 5, wherein numeral 18 designates a casting or other solidly constructed member and 19 an aperture formed at the junction of the engaging arm and the finger 20.

By means of the peculiar construction of the members 1 and 2 and 11 and 12 our improved poke may be quickly folded upon itself as illustrated in Fig. 3. The construction by which this result is rendered possible is of considerable importance. This construction enables the compact folding of the poke for shipment or storage, and thus saves space and protects the parts from injury.

What we claim and desire to secure by Letters Patent is:

In an animal poke, the combination of a yoke constructed in two U-shaped sections pivotally connected together, transverse pins secured to the respective sections intermediate of the ends thereof, fence-engaging or poke arms pivotally mounted at one end upon the pins and extended beyond such end to form an angularly disposed finger which terminates in a prong or spur, and spring clips formed at one end with returned portions engaging the yoke sections and having their other ends bearing against the fingers, as and for the purpose specified.

In testimony whereof we affix our signatures in presence of two witnesses.

MELYN E. BAKER. [L. S.]
  LEWIS C. BAKER. [L. S.]

Witnesses:
 JOHN O. PIERCE,
 E. T. RASMUSSEN.